Oct. 7, 1924.

E. A. BUSACKER

DUMP TRUCK

Filed May 6, 1921 2 Sheets-Sheet 1

1,510,762

Inventor
Emil A. Busacker.
By Morsell & Keeney.
Attorneys

Oct. 7, 1924.
E. A. BUSACKER
DUMP TRUCK
Filed May 6, 1921
1,510,762
2 Sheets-Sheet 2
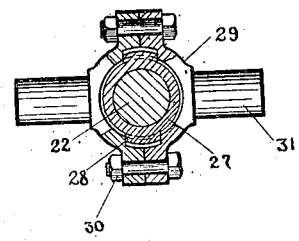
Fig. 4
Fig. 3
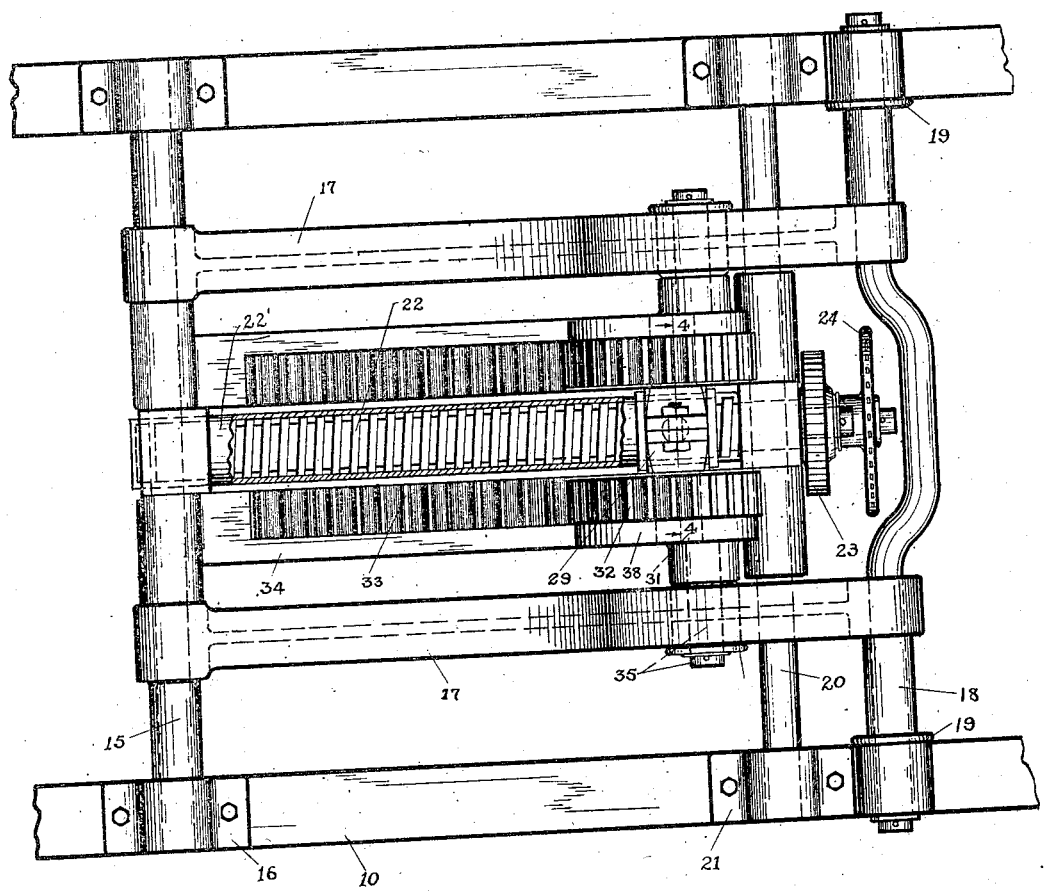
Inventor
Emil A. Busacker,
By Morsell + Kearney,
Attorneys Patented Oct. 7, 1924.

1,510,762

UNITED STATES PATENT OFFICE.

EMIL A. BUSACKER, OF MILWAUKEE, WISCONSIN.

DUMP TRUCK.

Application filed May 6, 1921. Serial No. 467,270.

*To all whom it may concern:*

Be it known that I, EMIL A. BUSACKER, a citizen of the United States, and resident of Milwaukee, in the county of Milwaukee and State of Wisconsin, have invented new and useful Improvements in Dump Trucks, of which the following is a description, reference being had to the accompanying drawings, which are a part of this specification.

My invention relates to dump trucks, and particularly to that type of dump truck in which the body is pivoted at one end and adapted to be raised at the other end, so the load may slide out the end of the truck body.

The primary object of my invention is to provide improved means of simple and strong construction, which will operate easily and positively to raise the truck body.

In its preferred form my invention contemplates a dump truck comprising a frame, a body pivoted at one end to the frame, a pair of levers positioned under the body, each of which is pivoted at one end to the frame and at the other end is provided with anti-friction means which bears against the under side of the body, a pair of rack members fixed to the frame, an enclosed screw mounted on the frame, a nut on the screw which is provided with a pair of stub shafts projecting laterally therefrom on which suitable gears engaging said racks are mounted, each gear having an eccentrically mounted roller positioned so as to bear against the under surface of said levers whereby turning said screw in the proper direction results in the nut traveling thereon toward the pivoted ends of said levers, the gears being rotated and the rollers thereon lifting said levers which in turn lift the truck body. A further object of my invention is to provide means whereby the gears and racks will not be subjected to the weight of the truck body and its load and to this end I preferably provide flanges on the gears and heavy plates under or along side of said racks which are fixed to the truck frame, the flanges on the gears being in bearing engagement with the plates and thus taking all the weight of the truck body and its load off of the gears and racks.

A further object of my invention is to provide lifting levers of such design and to so position the anti-friction means carried thereby that the rollers engaging the under surface of said levers and the gears will be relieved of all weight when the truck body is in non-dumping position. To this end the anti-friction means are positioned so as to bear on the truck frame when the body is in non-dumping position, that is to say, the rollers are interposed between the frame and the body, and the levers are arched sufficiently over the rollers so that when the body is in that position there is a slight clearance between the levers and the rollers.

The invention consists in the novel constructions, arrangements and devices for carrying out the above stated objects, and such other objects as will appear from the following description of a certain preferred embodiment illustrated in the accompanying drawings, wherein—

Fig. 3 is an enlarged plan view of the mechanism for raising and lowering the body; and Fig. 4 is a sectional view taken on the line 4—4 of Fig. 3.

Like characters of reference designate like parts in the several views.

Figure 1:
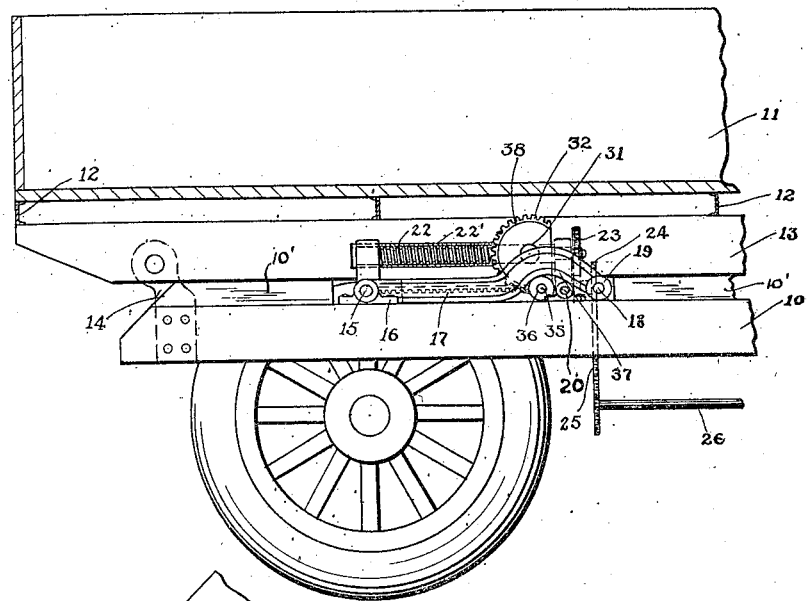
Fig. 1 is a side elevational view of a fragmentary portion of a truck embodying the principles of my invention, the truck being in its horizontal or non-dumping position.

The invention is illustrated as embodied in a truck having a frame including longitudinally extending sill members 10 and a body 11, the body resting on transverse bars 12 which rest on longitudinally extending sill members 13. The members 13 are positioned over the members 10 and supported on frame pieces 10′ when in their lower position and at the rear end are pivotally connected to the rear end of the members 10 by suitable brackets 14.

A transverse shaft 15 is journaled in suitable bearings 16 which are secured to the members 10 of the truck frame. A pair of lifting levers 17 are pivotally mounted at their rear ends on the shaft 15. Suitable anti-friction means is provided on the forward ends of the levers 17 for engaging the under surface of the body frame members 13. For this purpose a transverse shaft 18 extends through the forward ends of the levers 17, and is provided on each end with a roller 19 which is adapted to bear against the under surface of the members 13.

The truck frame is provided with a transverse shaft 20 journalled in bearings 21. On the shafts 15 and 20, respectively, are rigidly mounted a pair of upstanding bearing members 21 in which is journalled a rotatable screw 22. The screw 22 may be turned by hand in any convenient manner, but is preferably provided with a geared connection 23 with a sprocket drive 24, 25 and 26. The shaft portion 26 of the sprocket drive extends to the forward end of the truck, and is connected to the transmission of the vehicle in any manner desired.

An internally screw threading bushing 27 (see Fig. 4) is provided on the screw 22, this bushing having laterally extending lugs 28 which are adapted to be engaged by a nut 29. The nut 29 is formed in two parts, as shown in Fig. 4, which are held together by suitable bolts 30, each part being provided with a laterally extending stub shaft 31. A tubular member 22' closed at its outer end encloses the screw 22 and slides through the rear bearing 21 and is connected to the bushing and moves therewith. Said member 22' guides and protects the nut and the screw and may contain a lubricant to keep the screw lubricated at all times. A pair of gears 32 are mounted on the stub shafts 31 and are adapted to engage suitable racks formed on supporting plates 34 which are substantially coextensive with the screw 22 and are firmly secured to the truck frame. The gears 32 are each provided with a laterally outwardly extending stub shaft 35, the axis of this shaft being eccentric or offset with respect to the axis of the shafts 31 on which the gears are mounted. The shafts 35 extend under the lifting levers 17 and each shaft carries a roller 36 which is adapted to bear against the under surface of the lifting levers. From the arrangement above described, it will be apparent that when the screw 22 is turned in the proper direction, the nut 29 will travel rearwardly thereon, which will cause the gears 32 to travel from the position shown in Fig. 1 to the position shown in Fig. 2, which will result in the rollers 36 being carried from their lowest to their highest position. Consequently the lifting levers are moved into the position shown in Fig. 2, and the truck body positioned at an incline, so that the contents thereof may slide out the rear end.

Figure 2:
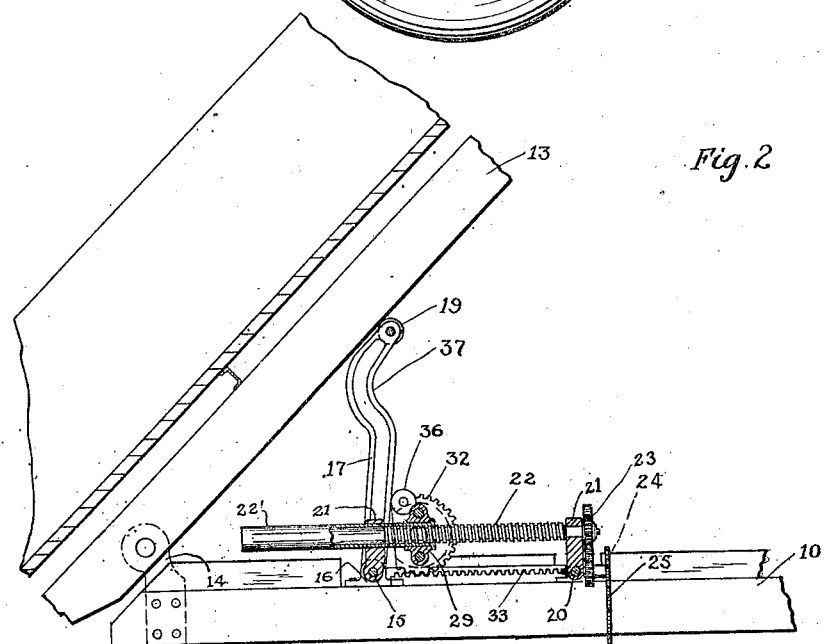
Fig. 2 is a side elevational view of the truck frame and body shown in Fig. 1, the body being inclined or in its dumping position.

When the truck body is in its horizontal or non-dumping position, as shown in Fig. 1, its weight is supported by the frame pieces 10' with the rollers 19 being at that time beneath the under surface of the body member 13 and above the top surface of the truck frame members 10. This, of course, is the normal position of the truck body, and in order to relieve the lifting mechanism from all strain and weight when the body is in that position, the lifting levers 17 are arched at 37 sufficiently to clear the rollers 36, and the shaft 20. In order to relieve the teeth of the gears 32 and the teeth of the racks 33 from undue weight, the gears 32 are each provided with a relatively heavy flange 38 which is adapted to bear on and travel over the plates 34.

The arrangement above described provides a very simple and powerful mechanism, which is easy to operate, for raising and lowering the truck body. Relieving the weight of the truck body from the lifting mechanism when the body is in its normal position and relieving the gear and rack teeth from undue weight greatly increases the life of the various parts thereof.

I claim:

1. A dump truck comprising a frame, a body pivoted on said frame, a lever pivoted at one end to said frame, said pivotal connection being fixed with relation to said frame, anti-friction means mounted on the other end of said lever and adapted to bear against the under side of said body, and means engaging the outer end portion of said lever and moving towards its pivot in a curved line to raise said lever for the purpose described.

2. A dump truck comprising a frame, a body pivoted on said frame, a lever pivoted at one end to said frame, anti-friction means mounted on the other end of said lever and adapted to bear against the under side of said body, a rack fixed to said frame, a gear associated with said rack, a roller eccentrically mounted on said gear and bearing against the under surface of said lever, and means for causing said gear to travel over said rack.

3. A dump truck comprising a frame, a body pivoted on said frame, a lever pivoted at one end to said frame, anti-friction means mounted on the other end of said lever and adapted to bear against the under side of said body, a rack fixed to said frame, a gear associated with said rack, a roller eccentrically mounted on said gear and bearing against the under surface of said lever, a screw mounted on said frame, a nut mounted on said screw and having a stub shaft, said gear being mounted on said shaft, and means for turning said screw.

4. A dump truck comprising a frame a body pivoted on said frame, a pair of levers each of which is pivoted at one end to said frame, anti-friction means mounted on the other ends of said levers and adapted to bear against the under side of said body, a pair of rack members fixed to said frame, a screw mounted on said frame, a nut on said screw, stub shafts projecting laterally from said nut, gears mounted on said shafts and engaging said respective racks, rollers eccentrically mounted on said gears and bearing against the under surface of said levers and means for turning said screw.

5. A dump truck comprising a frame, a body pivoted on said frame, a lever pivoted at one end to said frame, anti-friction means mounted on the other end of said lever and adapted to bear against the under side of said body, a plate fixed to said frame, a rack associated with said plate, a flanged gear associated with the said rack the flange thereof being in bearing engagement with said plate, a roller eccentrically mounted on said gear and bearing against the under surface of said lever and means for causing said gear to travel over said rack.

6. A dump truck comprising a frame, a body pivoted on said frame, a lever pivoted at one end to said frame, anti-friction means mounted on the other end of said lever and adapted to bear against the under side of said body, a plate fixed to said frame, a rack associated with said plate, a flanged gear associated with said rack, the flange thereof being in bearing engagement with said plate, a roller eccentrically mounted on said gear and bearing against the under surface of said lever, and means for causing said gear to travel over said rack, said lever being arched so as to clear said roller when the body is in non-dumping position.

7. A dump truck comprising a frame, a body pivoted on said frame, a lever pivoted at one end to said frame, anti-friction means mounted on the other end of said lever and adapted to bear against the under side of said body, a rack fixed to said frame, a gear associated with said rack, a roller eccentrically mounted on said gear and bearing against the under surface of said lever, a screw mounted on said frame, a nut mounted on said screw and having a stub shaft, and a tubular guide member which encloses the greater portion of the screw when the parts are in their inner position, said gear being mounted on said shaft, and means for turning said screw.

8. A dump truck comprising a frame, a body pivoted on said frame, a lever pivoted at one end to said frame, anti-friction means mounted on the other end of said lever and adapted to bear against the under side of said body, a rack fixed to said frame, a gear associated with said rack, a roller eccentrically mounted on said gear and bearing against the under surface of said lever, a screw mounted on said frame, a two part nut mounted on said screw and having a stub shaft, and forming a universal connection between the screw and the frame, said gear being mounted on said shaft, and means for turning said screw.

9. A dump truck, comprising a frame, a body pivoted at one end portion on said frame, a lever pivoted at one end to the frame and having its opposite end engaging the body, said lever pivotal connection being fixed with relation to the frame, and means engaging the lever and movable in a curved path towards its pivotal connection for raising the lever and the body.

10. A dump truck, comprising a frame, a body pivoted at one end portion on said frame, a lever pivoted at one end to the frame and having its opposite end engaging the body, said lever pivotal connection being fixed with relation to the frame, and a revoluble means engaging the outer end portion of the lever and movable in a curved path towards the pivotal connection of the lever while being carried by a member moving in a straight path for raising said lever and the body.

In testimony whereof, I affix my signature.

EMIL A. BUSACKER.